United States Patent
Zhang

(10) Patent No.: US 11,201,778 B2
(45) Date of Patent: Dec. 14, 2021

(54) AUTHORIZATION PROCESSING METHOD, DEVICE, AND SYSTEM

(71) Applicant: Huawei Technologies Co., Ltd., Shenzhen (CN)

(72) Inventor: Yaoye Zhang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 228 days.

(21) Appl. No.: 15/626,668

(22) Filed: Jun. 19, 2017

(65) Prior Publication Data

US 2017/0288937 A1    Oct. 5, 2017

Related U.S. Application Data

(63) Continuation of application No. PCT/CN2015/086788, filed on Aug. 12, 2015.

(30) Foreign Application Priority Data

Dec. 17, 2014    (CN) .......................... 201410789963.4

(51) Int. Cl.
*G06F 21/00*    (2013.01)
*H04L 29/06*    (2006.01)
(Continued)

(52) U.S. Cl.
CPC .............. *H04L 29/06* (2013.01); *G06F 21/10* (2013.01); *H04L 9/3213* (2013.01);
(Continued)

(58) Field of Classification Search
CPC . H04L 63/10; H04L 63/0884; H04L 63/0892; H04L 9/3213; H04L 63/105; G06F 21/10
See application file for complete search history.

(56) References Cited

U.S. PATENT DOCUMENTS 7,299,288 B2 * 11/2007 Chang ..................... G06F 21/31
                                                   709/219
8,613,055 B1 * 12/2013 Tomilson ................ G06F 21/00
                                                   713/182
(Continued)

FOREIGN PATENT DOCUMENTS

CN    102710640 A    10/2012
CN    102792311 A    11/2012
(Continued)

OTHER PUBLICATIONS

Machine Translation and Abstract of Chinese Publication No. CN102710640, Oct. 3, 2012, 23 pages.
(Continued)

*Primary Examiner* — Kendall Dolly
*Assistant Examiner* — Michael M Lee
(74) *Attorney, Agent, or Firm* — Conley Rose, P.C.

(57) ABSTRACT

An authorization processing method, a device, and a system, where the method includes receiving an authorization request from a public client, where the authorization request includes a client identifier of the public client, a requested redirect uniform resource identifier (URI), and a requested authorization scope, obtaining authorization information of the public client according to the client identifier, obtaining an authorization scope corresponding to an authorization credential stored in the authorization information, obtaining authorization notification information of an owner of a resource according to the requested authorization scope when the requested authorization scope exceeds the authorization scope corresponding to the authorization credential, generating a first access token whose authorization scope corresponds to the requested authorization scope, and sending the first access token to the public client according to the requested redirect URI. Hence, the method effectively (Continued)

resolves a security threat problem in a process of authorizing the public client.

20 Claims, 4 Drawing Sheets

(51) Int. Cl.
  *G06F 21/10* (2013.01)
  *H04L 9/32* (2006.01)
  *H04L 29/08* (2006.01)

(52) U.S. Cl.
  CPC ...... *H04L 63/0823* (2013.01); *H04L 63/0884* (2013.01); *H04L 63/0892* (2013.01); *H04L 63/10* (2013.01); *H04L 63/105* (2013.01); *H04L 63/126* (2013.01); *H04L 29/08* (2013.01)

(56) References Cited

U.S. PATENT DOCUMENTS

| | | | |
|---|---|---|---|
| 9,455,946 B1* | 9/2016 | Tovino | H04L 65/1069 |
| 2008/0077789 A1* | 3/2008 | Gondo | H04L 63/0884 713/155 |
| 2011/0225643 A1 | 9/2011 | Faynberg et al. | |
| 2011/0296517 A1* | 12/2011 | Grigoriev | H04L 63/102 726/12 |
| 2012/0060207 A1 | 3/2012 | Mardikar et al. | |
| 2013/0007309 A1* | 1/2013 | Miyazawa | H04L 63/0823 710/19 |
| 2013/0086645 A1 | 4/2013 | Srinivasan et al. | |
| 2014/0040993 A1 | 2/2014 | Lorenzo et al. | |
| 2014/0143836 A1* | 5/2014 | Fletcher | G06F 21/10 726/4 |
| 2014/0223516 A1* | 8/2014 | Vongsouvanh | H04L 63/0492 726/4 |
| 2014/0237228 A1* | 8/2014 | Robison | H04L 9/3268 713/158 |
| 2014/0282881 A1* | 9/2014 | Li | H04L 63/10 726/4 |
| 2015/0350177 A1* | 12/2015 | Sharp | H04L 63/08 726/6 |
| 2015/0365399 A1* | 12/2015 | Biswas | G06F 9/00 726/8 |
| 2015/0370615 A1* | 12/2015 | Pi-Sunyer | G05B 15/02 700/276 |

FOREIGN PATENT DOCUMENTS

| | | |
|---|---|---|
| CN | 102902900 A | 1/2013 |
| CN | 103139181 A | 6/2013 |
| CN | 103188244 A | 7/2013 |
| CN | 103460215 A | 12/2013 |
| CN | 103685139 A | 3/2014 |
| EP | 1095493 B1 | 4/2016 |
| WO | 2012119620 A1 | 9/2012 |
| WO | 2014130141 A1 | 8/2014 |

OTHER PUBLICATIONS

Machine Translation and Abstract of Chinese Publication No. CN103139181, Jun. 5, 2013, 24 pages.
Machine Translation and Abstract of Chinese Publication No. CN103188244, Jul. 3, 2013, 10 pages.
Hardt, D., Ed., "The OAuth 2.0 Authorization Framework", RFC 6749, Oct. 2012, 76 pages.
Foreign Communication From A Counterpart Application, PCT Application No. PCT/CN2015/086788, English Translation of International Search Report dated Nov. 9, 2015, 3 pages.
Foreign Communication From A Counterpart Application, PCT Application No. PCT/CN2015/086788, English Translation of Written Opinion dated Nov. 9, 2015, 7 pages.
Foreign Communication From A Counterpart Application, European Application No. 15869051.1, Extended European Search Report dated Nov. 7, 2017, 9 pages.
Machine Translation and Abstract of Chinese Publication No. CN102902900, Jan. 30, 2013, 11 pages.
Machine Translation and Abstract of Chinese Publication No. CN103685139, Mar. 26, 2014, 31 pages.
Foreign Communication From A Counterpart Application, Chinese Application No. 2014107899634, Chinese Search Report dated Oct. 23, 2018, 2 pages.
Foreign Communication From A Counterpart Application, Chinese Application No. 201410789963.4, Chinese Office Action dated Nov. 5, 2018, 6 pages.

* cited by examiner

AUTHORIZATION PROCESSING METHOD, DEVICE, AND SYSTEM

CROSS-REFERENCE TO RELATED APPLICATIONS

This application is a continuation of International Patent Application No. PCT/CN2015/086788 filed on Aug. 12, 2015, which claims priority to Chinese Patent Application No. 201410789963.4 filed on Dec. 17, 2014. The disclosures of the aforementioned applications are hereby incorporated by reference in their entireties.

TECHNICAL FIELD

The present disclosure relates to the field of communications technologies, and in particular, to an authorization processing method, a device, and a system.

BACKGROUND

With increasing use of distributed network services and cloud computing, a third-party client needs to be capable of accessing hosted resources of some servers. These resources are generally protected, and require private certificates (a typical certificate is a user name and a password) of owners of the resources for identity authentication.

In the OAuth protocol, a third-party client does not directly use a private certificate of an owner of a resource to access a protected resource, but uses an access token—a character string that represents a particular action scope (an authorization scope), duration, and another attribute. The access token is distributed to the third-party client by an authorization device under permission of the owner of the resource. The third-party client accesses, using the access token, the protected resource hosted by a resource server. However, the access token usually has a relatively short validity period, and after expiration, the third-party client cannot continue to access the protected resource. If the third-party client needs to continue to access the protected resource, the third-party client needs to reapply for an access token.

According to different security capabilities of existing third-party clients, the existing third-party clients can be generally classified into confidential clients and public clients. In the other approaches, different authorization procedures are defined for different types of clients, and an implicit grant manner is defined for public clients.

In an implicit grant procedure, when a public client reapplies for an access token, after an authorization device authenticates, according to a redirect Uniform Resource Identifier (URI), that a third-party client has a legal identity, and determines, according to a client identifier, that the authorization device has previously generated an access token for the public client, the authorization device generates a new access token according to a requested authorization scope in an authorization request of the public client, and returns the new access token to the public client. Therefore, in an authorization request sent for the first time, a malicious public client may induce a resource owner to grant a low-level authorization scope, and apply for a high-level authorization scope in a subsequent authorization request, thereby readily implementing permission elevation. For example, when performing authorization for the first time, a user A allows a public client to access a QQ message record of the user A, and in a subsequent authorization request, the public client further requests a permission of using QQ to send messages. In this case, the authorization device can authenticate legality of the public client according to a redirect URI, and also can find that the user A has authorized the public client. Therefore, the public client obtains an access token of the permission of using QQ to send messages. In this way, without permission of the user, the public client expands an authorization scope obtained by the public client. This results in a relatively great security threat when the public client is authorized in the other approaches.

SUMMARY

The present disclosure provides an authorization processing method, a device, and a system for a public client in order to resolve a technical problem of a security threat when a public client is authorized.

According to a first aspect, the present disclosure provides an authorization processing method, including receiving a first authorization request sent by the public client, where the first authorization request includes a client identifier of the public client, a requested redirect URI, and a first requested authorization scope, obtaining authorization information of the public client according to the client identifier, obtaining an authorization scope that corresponds to an authorization credential of the user stored in the authorization information, obtaining authorization notification information of an owner of the resource according to the first requested authorization scope if the first requested authorization scope exceeds the authorization scope corresponding to the authorization credential of the user, generating, according to the first requested authorization scope and the authorization notification information, a first access token whose authorization scope corresponds to the first requested authorization scope, and sending the first access token to the public client according to the requested redirect URI.

With reference to the first aspect, in a first possible implementation manner of the first aspect, obtaining authorization notification information of an owner of the resource according to the first requested authorization scope includes sending an authentication request to the owner of the resource, where the authentication request includes the first requested authorization scope, and receiving an authentication response message returned by the owner of the resource, where the authentication response message includes the authorization notification information of the owner of the resource, and the authorization notification information indicates that the owner of the resource agrees to authorize the user to access the resource using the public client within the first requested authorization scope.

With reference to the first aspect or the first possible implementation manner of the first aspect, in a second possible implementation manner of the first aspect, after obtaining authorization notification information of an owner of the resource, the method further includes generating an authorization credential whose authorization scope corresponds to the first requested authorization scope, and updating the authorization credential of the user using the generated authorization credential.

With reference to the first aspect, the first possible implementation manner of the first aspect, or the second possible implementation manner of the first aspect, in a third possible implementation manner of the first aspect, before obtaining an authorization scope that corresponds to an authorization credential of the user stored in the authorization information, the method further includes obtaining a registered redirect URI of the public client according to the client identifier, and determining that the requested redirect URI is the same as the registered redirect URI.

With reference to the second possible implementation manner of the first aspect, in a fourth possible implementation manner of the first aspect, the first authorization request further includes a user identifier of the user, the authorization information further includes a user identifier, and a correspondence exists between the user identifier in the authorization information and the authorization credential in the authorization information. Obtaining an authorization scope that corresponds to an authorization credential of the user stored in the authorization information includes querying the authorization information according to the user identifier of the user in the first authorization request in order to obtain the authorization credential corresponding to the user identifier of the user, and parsing the authorization credential corresponding to the user identifier of the user in order to obtain the authorization scope corresponding to the authorization credential of the user, and updating the authorization credential of the user using the generated authorization credential includes querying the authorization information according to the user identifier of the user in the first authorization request in order to obtain the authorization credential corresponding to the user identifier of the user, and updating, using the generated authorization credential, the authorization credential corresponding to the user identifier of the user.

With reference to the second possible implementation manner of the first aspect, in a fifth possible implementation manner of the first aspect, the method further includes receiving a second authorization request sent by the public client, where the second authorization request includes the client identifier, the requested redirect URI, and a second requested authorization scope, obtaining authorization information of the public client according to the client identifier, obtaining an authorization scope that corresponds to an authorization credential of the user stored in the authorization information, generating a second access token whose authorization scope corresponds to the second requested authorization scope or a second original authorization scope if the second requested authorization scope does not exceed the authorization scope corresponding to the authorization credential of the user, and sending the second access token to the public client according to the requested redirect URI.

With reference to any one of the first aspect or the first to the fifth possible implementation manners of the first aspect, in a sixth possible implementation manner of the first aspect, before receiving a first authorization request sent by the public client, the method further includes receiving a third authorization request sent by the public client, where the third authorization request includes the client identifier, the requested redirect URI, and a third requested authorization scope, obtaining authorization information of the public client according to the client identifier, determining that no authorization credential of the user exists in the authorization information, obtaining authorization notification information of the owner of the resource according to the third requested authorization scope, and generating, according to the third requested authorization scope and the authorization notification information obtained according to the third requested authorization scope, a third access token and a third authorization credential whose authorization scopes correspond to the third authorization scope, storing, in the authorization information, the third authorization credential as an authorization credential of the user, and sending the third access token to the public client according to the requested redirect URI.

According to a second aspect, an authorization device is provided, used to authorize a user to access a resource using a public client, including a receiving module configured to receive a first authorization request sent by the public client, where the first authorization request includes a client identifier of the public client, a requested redirect URI, and a first requested authorization scope, an obtaining module configured to obtain authorization information of the public client according to the client identifier, where the obtaining module is further configured to obtain an authorization scope that corresponds to an authorization credential of the user stored in the authorization information, and the obtaining module is further configured to obtain authorization notification information of an owner of the resource according to the first requested authorization scope if the first requested authorization scope exceeds the authorization scope corresponding to the authorization credential of the user, an execution module configured to generate, according to the first requested authorization scope and the authorization notification information, a first access token whose authorization scope corresponds to the first requested authorization scope, and a sending module configured to send the first access token to the public client according to the requested redirect URI.

With reference to the second aspect, in a first possible implementation manner of the second aspect, obtaining authorization notification information of an owner of the resource includes sending an authentication request to the owner of the resource, where the authentication request includes the first requested authorization scope, and receiving an authentication response message returned by the owner of the resource, where the authentication response message includes the authorization notification information of the owner of the resource, and the authorization notification information indicates that the owner of the resource agrees to authorize the user to access the resource using the public client within the first requested authorization scope.

With reference to the second aspect or the first possible implementation manner of the second aspect, in a second possible implementation manner of the second aspect, the execution module is further configured to generate, according to the first requested authorization scope, an authorization credential whose authorization scope corresponds to the first requested authorization scope, and update the authorization credential of the user using the generated authorization credential.

With reference to the second aspect, the first possible implementation manner of the second aspect, or the second possible implementation manner of the second aspect, in a third possible implementation manner of the second aspect, before obtaining an authorization scope that corresponds to an authorization credential of the user stored in the authorization information, the obtaining module is further configured to obtain a registered redirect URI of the public client according to the client identifier, and the execution module is further configured to determine that the requested redirect URI is the same as the registered redirect URI.

With reference to the second possible implementation manner of the second aspect, in a fourth possible implementation manner of the second aspect, the first authorization request further includes a user identifier of the user, the authorization information further includes a user identifier, and a correspondence exists between the user identifier in the authorization information and the authorization credential in the authorization information. Obtaining an authorization scope that corresponds to an authorization credential of the user stored in the authorization information includes querying the authorization information according to the user identifier of the user in the first authorization request in order to obtain the authorization credential corresponding to the user identifier of the user, and parsing the authorization credential corresponding to the user identifier of the user in order to obtain the authorization scope corresponding to the authorization credential of the user, and updating the authorization credential of the user using the generated authorization credential includes querying the authorization information according to the user identifier of the user in the first authorization request in order to obtain the authorization credential corresponding to the user identifier of the user, and updating, using the generated authorization credential, the authorization credential corresponding to the user identifier of the user.

With reference to the second possible implementation manner of the second aspect, in a fifth possible implementation manner of the second aspect, the receiving module is further configured to receive a second authorization request sent by the public client, where the second authorization request includes the client identifier, the requested redirect URI, and a second requested authorization scope, the obtaining module is further configured to obtain authorization information of the public client according to the client identifier, and obtain an authorization scope that corresponds to an authorization credential of the user stored in the authorization information, the execution module is further configured to generate a second access token whose authorization scope corresponds to the second requested authorization scope or a second original authorization scope if the second requested authorization scope does not exceed the authorization scope corresponding to the authorization credential of the user, and the sending module is further configured to send the second access token to the public client according to the requested redirect URI.

With reference to any one of the second aspect or the first to the fourth possible implementation manners of the second aspect, in a fifth possible implementation manner of the second aspect, the receiving module is further configured to receive a third authorization request sent by the public client, where the third authorization request includes the client identifier, the requested redirect URI, and a third requested authorization scope. The obtaining module is further configured to obtain authorization information of the public client according to the client identifier. The execution module is further configured to determine that no authorization credential of the user exists in the authorization information, obtain authorization notification information of the owner of the resource according to the third requested authorization scope, generate, according to the third requested authorization scope, a third access token and a third authorization credential whose authorization scopes correspond to the third authorization scope, and store, in the authorization information, the third authorization credential as an authorization credential of the user, and the sending module is further configured to send the third access token to the public client according to the requested redirect URI.

According to a third aspect, an authorization processing system is further provided, used to authorize a user to access a resource using a public client, including a public client configured to send a first authorization request to an authorization device, where the first authorization request includes a client identifier of the public client, a requested redirect URI, and a first requested authorization scope, and receive a first access token sent by the authorization device, and the authorization device configured to receive the first authorization request sent by the public client, obtain authorization information of the public client according to the client identifier, obtain an authorization scope that corresponds to an authorization credential of the user stored in the authorization information, obtain authorization notification information of an owner of the resource according to the first requested authorization scope if the first requested authorization scope exceeds the authorization scope corresponding to the authorization credential of the user, generate, according to the first requested authorization scope and the authorization notification information, a first access token whose authorization scope corresponds to the first requested authorization scope, and send the first access token to the public client according to the requested redirect URI.

According to the technical solutions provided in the present disclosure, an authorization credential of a user is stored in an authorization device, when an authorization request of a public client is received, an authorization scope corresponding to the stored authorization credential of the user is compared with a requested authorization scope in the authorization request, and when the requested authorization scope in the authorization request exceeds the authorization scope corresponding to the stored authorization credential of the user, authorization notification information of an owner of a resource needs to be obtained first, and an access token is then generated. In this way, a security threat problem in a process of authorizing a public client is effectively resolved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the embodiments of the present disclosure in detail with reference to accompanying drawings.

Figure 1:
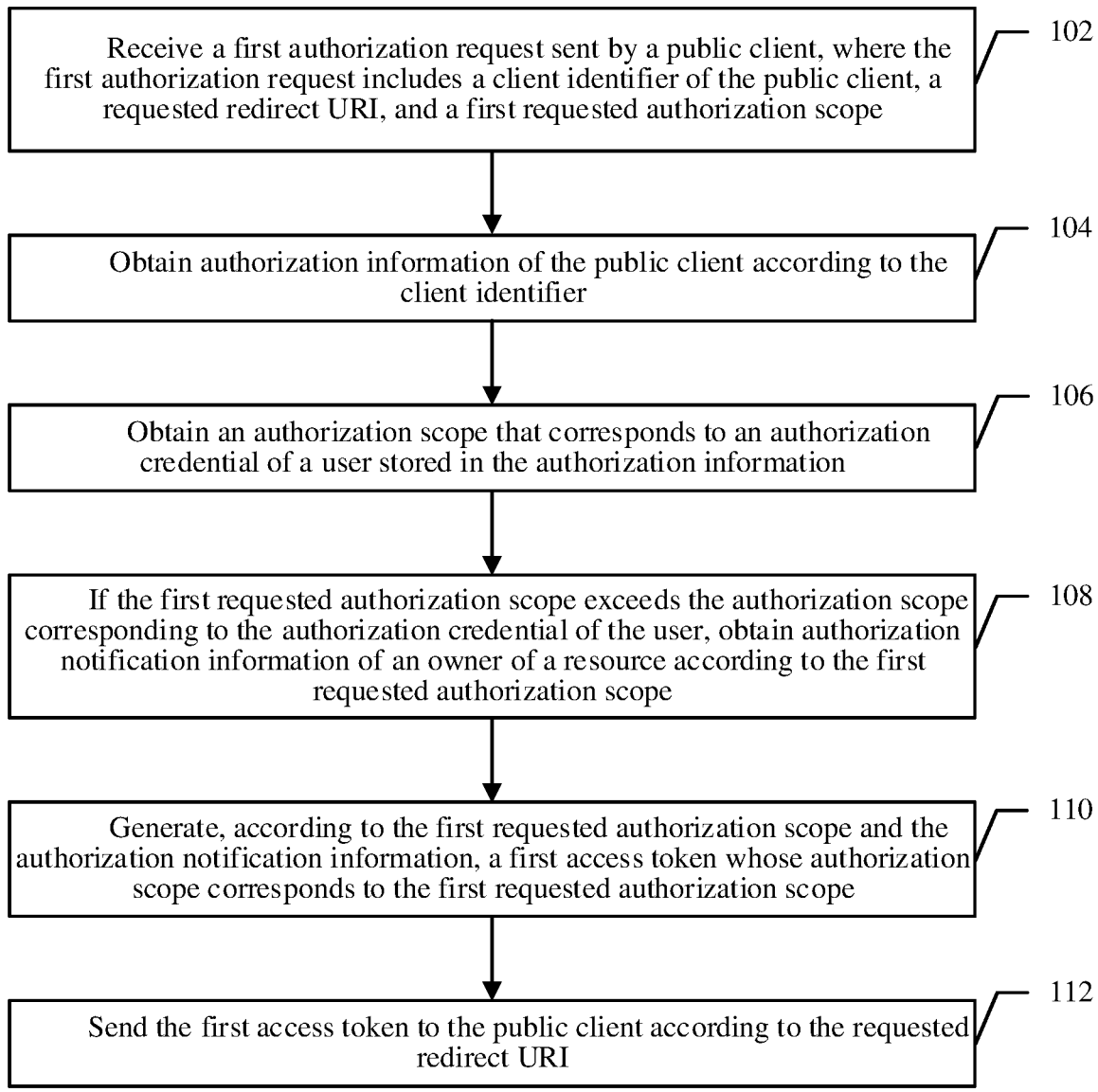
FIG. 1 is a flowchart of an authorization processing method according to an embodiment of the present disclosure.

FIG. 1 is a flowchart of an authorization processing method according to an embodiment of the present disclosure. In a specific implementation process, the authorization processing method may be performed by an authorization device. The authorization device is configured to accept registration of a public client, manage identity authentication of an owner of a resource, and provide an access token to the public client when the owner of the resource performs authorization. The public client accesses a protected resource by showing the access token to a resource server. After the authorization device receives an authorization request sent by the public client, if an authorization credential of a user cannot be obtained, or an authorization credential of a user can be obtained but a requested authorization scope in the authorization request received by the authorization device exceeds an authorization scope corresponding to the authorization credential of the user, the authorization device needs to first obtain an authentication grant of the owner of the resource, and then the authorization device can authorize the authorization request sent by the user via the public client. When the requested authorization scope in the authorization request received by the authorization device does not exceed the authorization scope corresponding to the authorization credential of the user, the authorization device may directly authorize, according to the authorization credential of the user, the authorization request sent by the user via the public client. Further, the method includes the following steps.

Step 102: Receive a first authorization request sent by the public client, where the first authorization request includes a client identifier of the public client, a requested redirect URI, and a first requested authorization scope.

Further, the public client may be application software or a browser plug-in developed by a third party, and this type of client cannot securely store the authorization credential for a long time. The authorization credential includes information such as an authorization scope that is already obtained by the user for the resource using the public client, and the authorization scope includes an access range and/or an access permission for the resource. The client identifier is generated by the authorization device and allocated to the public client when the public client is registered with the authorization device. The client identifier identifies the public client when the public client interacts with the authorization device. The first requested authorization scope indicates an access range and/or an access permission, which the user desires to obtain using the public client, for the protected resource. The requested redirect URI indicates an address to which the authorization device returns a response message. After generating an access token, the authorization device returns the generated access token to the public client using the requested redirect URI.

Step 104: Obtain authorization information of the public client according to the client identifier.

The authorization information includes an authorization credential, which is obtained by the user using the public client, for the protected resource. The authorization device stores and maintains the authorization information, and a correspondence is established between the client identifier and the authorization information. The authorization information may be obtained according to the client identifier.

Step 106: Obtain an authorization scope that corresponds to an authorization credential of the user stored in the authorization information.

The authorization credential includes information such as an authorization scope that is already obtained by the user for the resource using the public client. The authorization device may obtain, by parsing the authorization credential, the authorization scope corresponding to the authorization credential. The authorization device may generate a corresponding access token according to the authorization credential, and an authorization scope of the access token does not exceed the authorization scope of the authorization credential.

Step 108: If the first requested authorization scope exceeds the authorization scope corresponding to the authorization credential of the user, obtain authorization notification information of an owner of the resource according to the first requested authorization scope.

Further, when the authorization device determines that the first requested authorization scope exceeds the authorization scope corresponding to the authorization credential of the user, it indicates that the user of the public client desires to obtain a larger authorization scope for the protected resource. For the sake of security, authorizing the user who uses the public client to operate the protected resource within the larger authorization scope should get authentication from the owner of the protected resource.

Obtaining authorization notification information of an owner of the resource includes sending an authentication request to the owner of the resource, where the authentication request includes the first requested authorization scope, and receiving an authentication response message returned by the owner of the resource, where the authentication response message includes the authorization notification information of the owner of the resource, and the authorization notification information indicates that the owner of the resource agrees to authorize the user to access the resource using the public client within the first requested authorization scope. Optionally, when the authentication response message includes information indicating that the owner of the resource does not agree to authorize, in the first requested authorization scope, the user who uses the public client, or when identity authentication information in the authorization notification information is incorrect, the authorization device rejects the received first authorization request, and the authorization procedure ends.

Step 110: Generate, according to the first requested authorization scope and the authorization notification information, a first access token whose authorization scope corresponds to the first requested authorization scope.

Optionally, the authorization notification information includes identity authentication information of the owner of the resource and authorization grant information for authorization. The identity authentication information of the owner of the resource may be an account password, biological feature authentication, or other information that can prove an identity of the owner of the resource. Specific forms of the identity authentication information of the owner of the resource and the authorization grant information are not limited in this embodiment of the present disclosure.

The authorization device generates the first access token according to the first authorization scope after it is determined, according to the authorization notification information, that the owner of the resource agrees to authorize the user who uses the public client to operate the resource within the first authorization scope.

Optionally, the authorization device further generates, according to the first requested authorization scope and the authorization notification information, an authorization credential whose authorization scope corresponds to the first requested authorization scope, and updates the authorization credential of the user using the generated authorization credential.

Step 112: Send the first access token to the public client according to the requested redirect URI.

The authorization device sends the generated first access token to the public client using the requested redirect URI in the authorization request such that the user accesses, with the first access token, the protected resource on the resource server using the public client.

With the first access token, the user may use a permission in the first requested authorization scope to access the protected resource using the public client. However, the first access token has a relatively short validity period. After the access token expires, the public client needs to reapply for a new access token to access the protected resource.

Optionally in order to prevent malicious software from masquerading the public client to apply for an access token, causing an access token leakage threat, before step 106 of obtaining an authorization scope that corresponds to an authorization credential of the user stored in the authorization information, the authorization device further obtains a registered redirect URI of the public client according to the client identifier, and determines that the requested redirect URI is the same as the registered redirect URI. The registered redirect URI is provided by the public client when the public client is registered with the authorization device. The authorization device rejects the first authorization request, and the authorization procedure ends if the requested redirect URI in the first authorization request is different from the registered redirect URI.

When the public client is used by multiple different users in order to distinguish different users, the first authorization request further includes user identifiers of the users. The authorization information further includes a user identifier, and a correspondence exists between the user identifier in the authorization information and the authorization credential in the authorization information. After the authorization information is obtained according to the client identifier, step 106 of obtaining an authorization scope that corresponds to an authorization credential of the user stored in the authorization information includes querying the authorization information according to the user identifier of the user in the first authorization request in order to obtain the authorization credential corresponding to the user identifier of the user, and parsing the authorization credential corresponding to the user identifier of the user in order to obtain the authorization scope corresponding to the authorization credential of the user. Updating the authorization credential of the user using the generated authorization credential includes querying the authorization information according to the user identifier of the user in the first authorization request in order to obtain the authorization credential corresponding to the user identifier of the user, and updating, using the generated authorization credential, the authorization credential corresponding to the user identifier of the user.

Further, when the requested authorization scope in the authorization request received by the authorization device does not exceed the authorization scope corresponding to the authorization credential of the user stored in the authorization device, the authorization device may directly generate an access token according to the authorization credential of the user and return the access token to the public client without the need of applying for authentication of the owner of the resource. The authorization device receives a second authorization request sent by the public client, where the second authorization request includes the client identifier, the requested redirect URI, and a second requested authorization scope, obtains authorization information of the public client according to the client identifier, obtains an authorization scope that corresponds to an authorization credential of the user stored in the authorization information, generates a second access token whose authorization scope corresponds to the second requested authorization scope or a second original authorization scope if the second requested authorization scope does not exceed the authorization scope corresponding to the authorization credential of the user, and sends the second access token to the public client according to the requested redirect URI.

Further, when the authorization credential of the user cannot be obtained because it is the first time that the user sends an authorization request for the resource to the authorization device or due to other reasons, the user needs to be authenticated by the owner of the resource before being authorized. The authorization device receives a third authorization request sent by the public client, where the third authorization request includes the client identifier, the requested redirect URI, and a third requested authorization scope, obtains authorization information of the public client according to the client identifier, determines that no authorization credential of the user exists in the authorization information, obtains authorization notification information of the owner of the resource according to the third requested authorization scope, generates, according to the third requested authorization scope and the authorization notification information obtained according to the third requested authorization scope, a third access token and a third authorization credential whose authorization scopes correspond to the third authorization scope, stores, in the authorization information, the third authorization credential as an authorization credential of the user, and sends the third access token to the public client according to the requested redirect URI.

Optionally, the authorization device stores registration information of the public client, where the registration information includes the authorization information of the public client and the registered redirect URI. The authorization device generates the client identifier and the registration information, stores the registration information, and sends the client identifier to the public client when the public client is registered with the authorization device. A correspondence exists between the stored registration information and the client identifier. Therefore, the authorization device may obtain the registration information of the public client according to the client identifier, and further obtains the authorization information and the registered redirect URI. A procedure in which the authorization device accepts registration of the public client includes receiving a registration request sent by the public client, where the registration request includes the registered redirect URI, generating the registration information, where the registration information includes the registered redirect URI and the authorization information of the public client, generating the client identifier according to the registration request, sending the client identifier to the public client, and storing the client identifier, where the client identifier corresponds to the registration information. Optionally, the registration request further includes the authorization information of the public client, and content in the authorization information is null. The authorization information whose content is null is generated by the authorization device and is stored in the registration information of the client when the registration request does not include the authorization information of the public client. Further, the registration request further includes description information of the public client. Because the description information is unrelated to the present disclosure, the description information is not limited in the present disclosure.

Optionally in order to differ from an authorization processing procedure in the other approaches, the first authorization request further includes an authorization response type. Before the authorization credential of the user in the authorization information is obtained, the method further includes determining, by the authorization device, that a value of the authorization response type is a first value, where the first value indicates that the authorization device processes the first authorization request according to the foregoing method.

The public client may access the protected resource on the resource server using the access token. However, the access token usually has a relatively short validity period. Optionally, after the access token expires, when the public client accesses the resource server using the expired access token, the resource server parses the access token and finds that the access token has failed, and the resource server returns a token failure response message to the public client. In this case, the public client may initiate an authorization request again to the authorization device, and reenters the foregoing processing procedure. It should be noted that in this embodiment of the present disclosure, a validity period of the authorization credential is longer than the validity period of the access token.

In this embodiment of the present disclosure, an authorization credential of a user is stored in an authorization device, an authorization scope corresponding to the stored authorization credential of the user is compared with a requested authorization scope in the authorization request when an authorization request of a public client is received, and when the requested authorization scope in the authorization request exceeds the authorization scope corresponding to the stored authorization credential of the user, authorization notification information of an owner of a resource needs to be obtained first, and an access token is then generated. In this way, a security threat problem in a process of authorizing a public client is effectively resolved.

Figure 2:
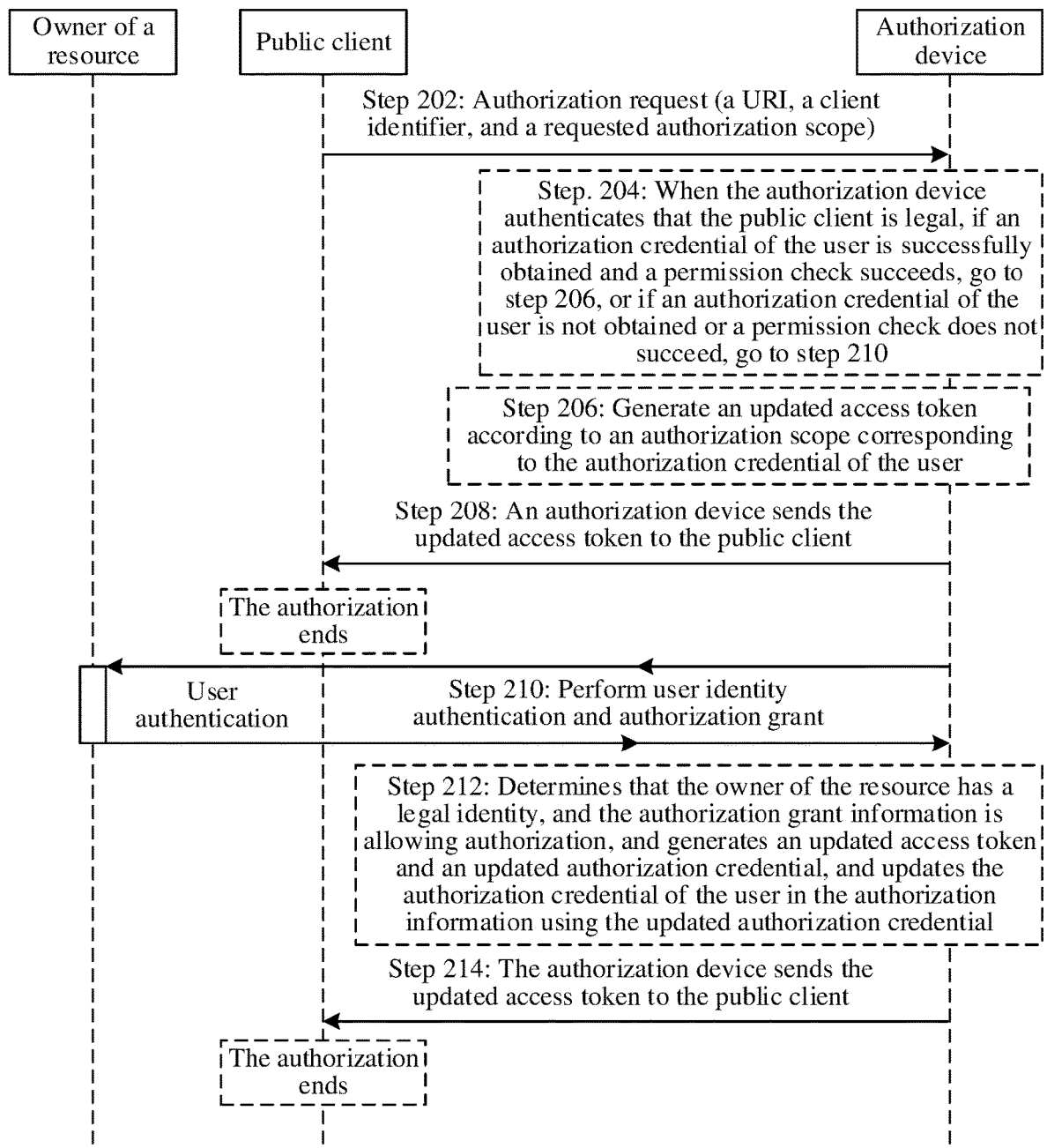
FIG. 2 is an exemplary signaling diagram of an authorization processing method according to an embodiment of the present disclosure.

FIG. 2 is an exemplary signaling diagram of an authorization processing method according to an embodiment of the present disclosure. A public client shown in FIG. 2 may be application software or a browser plug-in developed by a third party, and a user desires to obtain an access token from an authorization device using the public client in order to access a protected resource on a resource server.

Step 202: The public client sends an authorization request to the authorization device, where the authorization request includes a client identifier of the public client, a requested redirect URI, and a requested authorization scope.

The authorization request includes a client identifier "Client ID", a requested redirect URI "redirect_uri", and a requested authorization scope "scope".

Step 204: When the authorization device authenticates that the public client is legal, if an authorization credential of the user is successfully obtained and a permission check succeeds, go to step 206, or if an authorization credential of the user is not obtained or a permission check does not succeed, go to step 210.

The authorization device stores and maintains registration information of the public client. The registration information includes a registered redirect URI and authorization information, that is, auth_tokens. The authorization information is used to record the authorization credential of the user. The registration information corresponds to the client identifier, and the registration information of the public client may be obtained according to the client identifier.

The authorization device compares the requested redirect URI in the authorization request with the registered redirect URI in the registration information in order to determine whether an identity of the public client is legal. When the requested redirect URI is the same as the registered redirect URI, it indicates that the identity of public client is legal.

The authorization credential of the user includes information such as an authorization scope that is already obtained by the user for a resource using the public client. The authorization device may obtain, by parsing the authorization credential of the user, an authorization scope corresponding to the authorization credential of the user. The authorization device may generate a corresponding access token according to the authorization credential of the user, and an authorization scope of the access token does not exceed the authorization scope of the authorization credential of the user. The authorization information is maintained by the authorization device, and content in the authorization information is null when the authorization device has not yet authorized the user who uses the public client.

The authorization device may set a specific policy to perform processing such as rotation and invalidation upon expiration on the authorization credential of the user. Therefore, the authorization device may cancel the authorization credential of the user in a period of time after the authorization, causing occurrence of a case in which the authorization credential of the user cannot be found. In addition, when the public client applies for authorization for the first time, content in an auth_tokens field is null. In this case, the authorization credential also cannot be obtained.

When the authorization credential of the user cannot be obtained from the registration information of the public client according to the client identifier, authorization needs to be authenticated by an owner of the resource before being authorized. When the authorization credential of the user is successfully obtained according to the client identifier, the authorization scope corresponding to the authorization credential of the user is obtained according to the authorization credential of the user, and the authorization scope in the authorization request is compared with the authorization scope corresponding to the authorization credential of the user, to determine whether a permission check succeeds. Further, if the requested authorization scope does not exceed the authorization scope corresponding to the authorization credential of the user, it indicates that the permission check succeeds. If the requested authorization scope exceeds the authorization scope corresponding to the authorization credential of the user, it indicates that the permission check does not succeed. Authorization also needs to be authenticated by the owner of the resource before being authorized when the permission check does not succeed.

Step 206: Generate an updated access token according to an authorization scope corresponding to the authorization credential of the user.

The updated access token has a same authorization scope as that of the authorization credential of the user.

Step 208: The authorization device sends the updated access permission to the public client, and the authorization procedure ends.

The public client accesses the protected resource on the resource server using the updated access token. After the updated access token expires, the public client needs to further apply for authorization to access the protected resource.

Step 210: The authorization device sends an authentication request to an owner of a resource, where the authentication request includes the requested authorization scope. The owner of the resource returns an authentication response message, where the authentication response message includes identity authentication information of the owner of the resource and authorization grant information.

The identity authentication information of the owner of the resource may be an account password, biological feature authentication, or other information that can prove an identity of the owner of the resource. Specific forms of the identity authentication information of the owner of the resource and the authorization grant information are not limited in this embodiment of the present disclosure. Further, the owner of the resource in this embodiment of the present disclosure may receive the authentication request of the authorization device using an application program such as a browser. The application program such as a browser displays an authentication page to the owner of the resource, where the page displays the requested authorization scope. The owner of the resource enters the identity authentication information on the authentication page, and selects to allow or reject authorization. Then, the application program such as a browser sends the identity authentication information and the authorization grant that are on the authentication page to the authorization device. It should be noted that a manner for receiving the authentication request and a manner for returning the authorization notification information by the owner of the resource are not limited in this embodiment of the present disclosure.

Step 212: The authorization device determines, according to the identity authentication information, that the owner of the resource has a legal identity, and that the authorization grant information is allowing authorization, and generates an updated access token and an updated authorization credential according to the requested authorization scope, and updates the authorization credential of the user in the authorization information using the updated authorization credential.

The updated access token has the same authorization scope as that of the updated authorization credential. In this embodiment of the present disclosure, the authorization scopes thereof are both the requested authorization scope in the authorization request. However, a validity period of the updated authorization credential is longer than a validity period of the updated access token. In the validity period of the updated authorization credential, the authorization device may generate, according to the updated authorization credential, an access token whose authorization scope is consistent with the authorization scope of the updated authorization credential.

The authorization device obtains registration information of the public client according to the client identifier in order to obtain the authorization information of the public client, and updates the authorization credential of the user in auth_tokens using the updated authorization credential.

Step 214: The authorization device sends the updated access token to the public client, and the authorization procedure ends.

The public client accesses the protected resource on the resource server using the updated access token. After the updated access token expires, the public client needs to further apply for authorization to access the protected resource.

Optionally, before step 202 of receiving, by the authorization device, the authorization request sent by the public client, the method further includes receiving a registration request sent by the public client, where the registration request includes the registered redirect URI, generating, by the authorization device, the registration information, where the registration information includes the registered redirect URI and the authorization information of the public client, where content in the authorization information is null, generating the client identifier according to the registration request, sending the client identifier to the public client, and storing the client identifier, where the client identifier corresponds to the registration information. Optionally, the registration request further includes the authorization information of the public client, and content in the authorization information is null. When the registration request does not include the authorization information of the public client, the authorization information whose content is null is generated by the authorization device and is stored in the registration information of the client.

Optionally, the authorization credential of the user may be a refresh token. It should be noted that when the authorization credential of the user is a refresh token, an authorization scope of the access token generated according to the refresh token of the user is the same as the authorization scope corresponding to the authorization credential of the user.

In this embodiment of the present disclosure, an authorization credential of a user is stored in an authorization device. An authorization scope corresponding to the stored authorization credential of the user is compared with a requested authorization scope in the authorization request when an authorization request of a public client is received, and when the requested authorization scope in the authorization request exceeds the authorization scope corresponding to the stored authorization credential of the user, authorization notification information of an owner of a resource needs to be obtained first, and an access token is then generated. In this way, a security threat problem in a process of authorizing a public client is effectively resolved.

Figure 3:
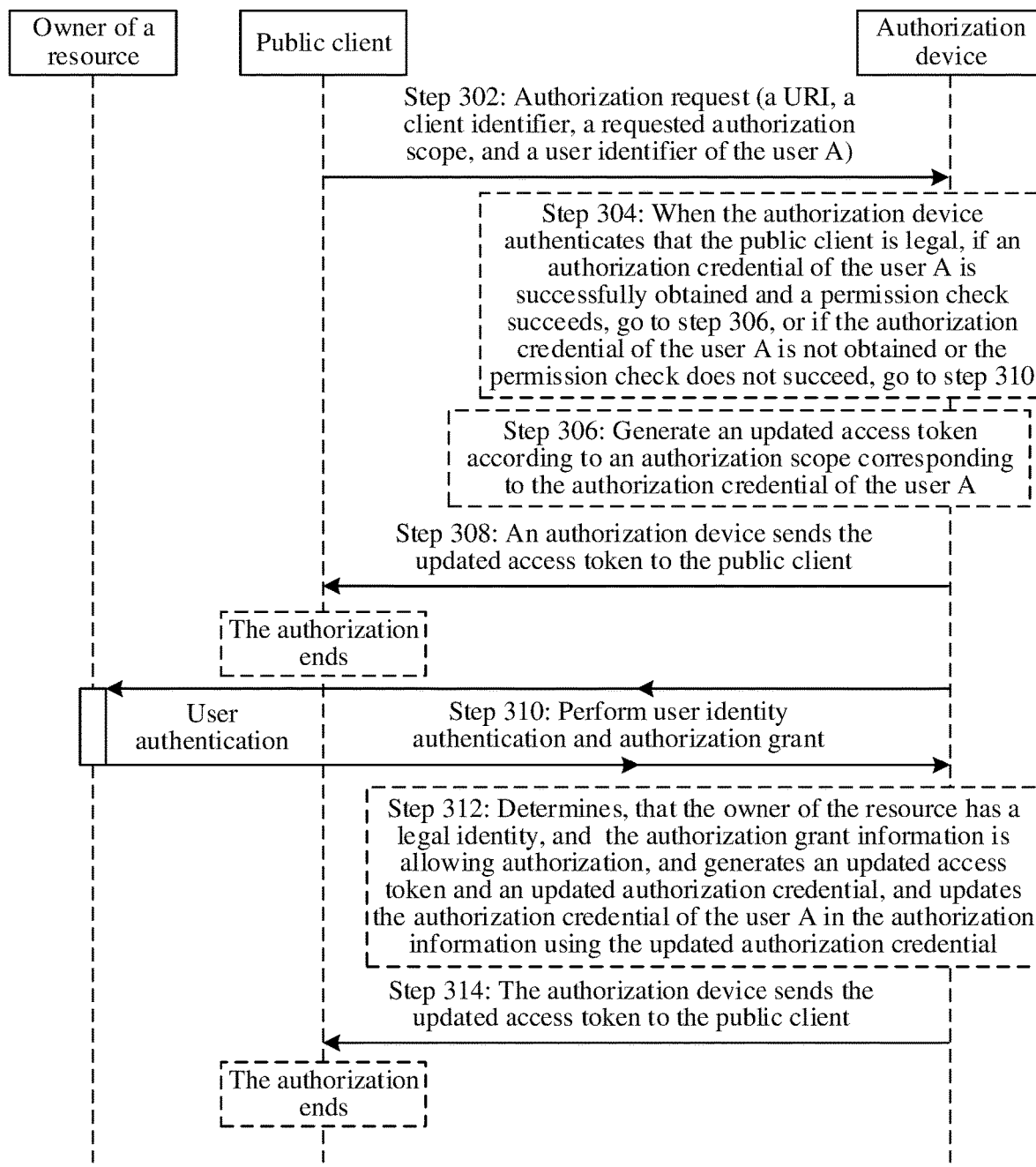
FIG. 3 is an exemplary signaling diagram of an authorization processing method according to an embodiment of the present disclosure.

FIG. 3 is an exemplary signaling diagram of an authorization processing method according to an embodiment of the present disclosure. In this embodiment, multiple users separately receive an authorization grant on a same authorization device using a same public client. The public client may authenticate an identity of each user in at least one manner of an account password, biological feature authentication, or another identity authentication manner. The public client maintains identity authentication information of each user, and allocates, to each user, a unique user identifier on the public client side. Because authorization information of the public client stored in the authorization device corresponds to the public client rather than corresponding to a user who uses the public client, the authorization device uses same authorization information when processing an authorization request of each user who uses the public client. Therefore, authorization credentials of different users cannot be distinguished. In order to distinguish, in the authorization information of the public client, the authorization credentials of different users authorized using the public client, the authorization information further includes user identifiers, and a correspondence exists between the user identifiers in the authorization information and the authorization credentials in the authorization information. In this embodiment, the authorization information of the public client and a registered redirect URI are stored in registration information of the public client. Optionally, a user_num field is added to indicate a quantity of users who are authorized using the public client, and the authorization information, that is, an auth_tokens field, is extended to be a user authorization credential set. Each element in the user authorization credential set records an authorization credential of one user. Further, in addition to recording one authorization credential, each element in the user authorization credential set further records one user identifier. Preferably, the user authorization credential set may be a dynamic array of character strings. The method includes the following steps.

Step 302: A user A sends an authorization request to the authorization device using a public client, where the authorization request includes a client identifier of the public client, a requested redirect URI, a requested authorization scope, and a user identifier of the user A.

The authorization request includes Client ID, redirect_uri, scope, and state. The Client ID parameter includes the client identifier, the redirect_uri parameter includes the requested redirect URI, the scope parameter includes the requested authorization scope, and the state parameter includes the user identifier of the user A.

Step 304: When the authorization device authenticates that the public client is legal, if an authorization credential of the user A is successfully obtained and a permission check succeeds, go to step 306, or if the authorization credential of the user A is not obtained or the permission check does not succeed, go to step 310.

The authorization device stores and maintains registration information of the public client, where the registration information includes registered redirect URI, authorization information auth_tokens, and optionally, user quantity user_num, where auth_tokens is a user authorization credential set, and each element in the user authorization credential set records an authorization credential of one user. Further, in addition to recording one authorization credential, each element in the user authorization credential set further records one user identifier.

Further, the authorization device compares the requested redirect URI in the authorization request with the registered redirect URI in the registration information in order to determine whether an identity of the public client is legal. When the requested redirect URI is the same as the registered redirect URI, it indicates that the identity of public client is legal. The authorization device queries all elements in the auth_tokens user authorization credential set in the registration information according to the user identifier in the authorization request in order to obtain the authorization credential of the user A.

The authorization device may set a specific policy to perform processing such as rotation and invalidation upon expiration on the authorization credential in the authorization information. Therefore, the authorization device may cancel the credential in the authorization information in a period of time after the authorization, causing occurrence of a case in which the authorization credential cannot be found. In addition, when the user A applies for authorization for the first time using the client, the authorization credential corresponding to the user A does not exist in the auth_tokens field. In this case, the authorization credential of the user A also cannot be obtained.

The user A needs to be authenticated by an owner of a resource before being authorized when the authorization credential of the user A cannot be obtained from the authorization information of the public client according to the user identifier of the user A. When the authorization credential of the user A is successfully obtained according to the user identifier of the user A, an authorization scope corresponding to the authorization credential of the user A is obtained according to the authorization credential of the user A, and the requested authorization scope in the authorization request is compared with the authorization scope corresponding to the authorization credential of the user A in order to determine whether a permission check succeeds. Further, if the requested authorization scope does not exceed the authorization scope corresponding to the authorization credential of the user A, it indicates that the permission check succeeds. If the requested authorization scope exceeds the authorization scope corresponding to the authorization credential of the user A, it indicates that the permission check does not succeed. The user A also needs to be authenticated by an owner of a resource before being authorized when the permission check does not succeed.

Step 306: Generate an updated access token according to an authorization scope corresponding to the authorization credential of the user A.

Further, the generated updated access token has a same authorization scope as that of the authorization credential of the user A.

Step 308: The authorization device sends the updated access token to the public client, and the authorization procedure ends.

Step 310: The authorization device sends an authentication request to an owner of a resource, where the authentication request includes the requested authorization scope. The owner of the resource returns an authentication response message, where the authentication response message includes identity authentication information of the owner of the resource and authorization grant information.

Step 312: The authorization device determines, according to the identity authentication information, that the owner of the resource has a legal identity, and that the authorization grant information is allowing authorization, and generates an updated access token and an updated authorization credential according to the requested authorization scope, and updates the authorization credential of the user A in the authorization information using the updated authorization credential.

The updated access token has the same authorization scope as that of the updated authorization credential. The updating the authorization credential of the user A in the authorization information using the updated authorization credential includes adding, by the authorization device, an element to auth_tokens using the identifier of the user A and the updated authorization credential when the authorization credential of the user A cannot be found in the auth_tokens field of the registration information, and querying, by the authorization device, all elements in the auth_tokens field using the identifier of the user A, determining an element recording the authorization credential of the user A, and replacing, with the updated authorization credential, an authorization credential in the element recording the authorization credential of the user A when the authorization credential of the user A can be found in the auth_tokens field in the registration information.

Step 314: The authorization device sends the updated access token to the public client, and the authorization procedure ends.

Optionally, the auth_tokens field in this embodiment of the present disclosure may be a dynamic array of character strings. Each array element in the dynamic array of character strings is an authorization credential of one user, and further, a structure form of one array element is as follows:

| User ID | "&" | auth_cred |
| --- | --- | --- |

The User ID field is a user identifier, and the auth_cred field is an authorization credential of the user. The authorization device obtains the registration information of the public client according to the client identifier in the authorization request in order to obtain the authorization information of the public client when receiving the authorization request. The dynamic array of character strings is queried according to the user identifier in the authorization request. If the authorization credential corresponding to the user identifier cannot be obtained, after the authorization device generates an updated authorization credential, a character string User A+"&"+rt is constructed, the character string is added to an auth_tokens array as the authorization credential of the user A, where User A is the user identifier of the user A, and rt is a generated updated authorization credential. Optionally, when the registration information includes a user_num field, user_num is increased by 1, indicating that the authorization information has an authorization credential of one more user.

The dynamic array of character strings is queried according to the user identifier in the authorization request. If the authorization credential corresponding to the user identifier may be obtained, it is determined that the authorization request is a repeated authorization request sent by the user using the public client. After generating the updated authorization credential, the authorization device replaces an original authorization credential with the updated authorization credential. Optionally, when the registration information includes the user_num field, user_num keeps unchanged.

In this embodiment of the present disclosure, an authorization credential of a user is stored in an authorization device, an authorization scope corresponding to the stored authorization credential of the user is compared with a requested authorization scope in the authorization request when an authorization request of a public client is received, and authorization notification information of an owner of a resource needs to be obtained first, and an access token is then generated when the requested authorization scope in the authorization request exceeds the authorization scope corresponding to the stored authorization credential of the user. In this way, a security threat problem in a process of authorizing a public client is effectively resolved.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that all the embodiments described in this specification belong to preferred embodiments, and the involved actions and modules are not necessarily mandatory to the present disclosure.

The device and system that are provided in the embodiments of the present disclosure are further described below.

Figure 4:
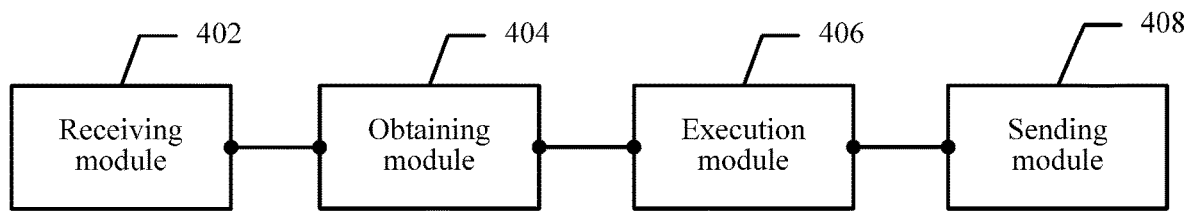
FIG. 4 is a schematic structural diagram of an authorization device according to an embodiment of the present disclosure.

FIG. 4 is a schematic structural diagram of an authorization device according to an embodiment of the present disclosure. The authorization device is configured to accept registration of a public client, manage identity authentication of an owner of a resource, and provide an access token to the public client when the owner of the resource performs authorization. As shown in FIG. 4, the authorization device includes a receiving module 402, an obtaining module 404, an execution module 406, and a sending module 408.

The receiving module 402 is configured to receive a first authorization request sent by the public client, where the first authorization request includes a client identifier of the public client, a requested redirect URI, and a first requested authorization scope.

The obtaining module 404 is configured to obtain authorization information of the public client according to the client identifier, obtain an authorization scope that corresponds to an authorization credential of a user stored in the authorization information, and obtain authorization notification information of an owner of the resource according to the first requested authorization scope if the first requested authorization scope exceeds the authorization scope corresponding to the authorization credential of the user.

The obtaining authorization notification information of an owner of the resource includes sending an authentication request to the owner of the resource, where the authentication request includes the first requested authorization scope, and receiving an authentication response message returned by the owner of the resource, where the authentication response message includes the authorization notification information of the owner of the resource, and the authorization notification information indicates that the owner of the resource agrees to authorize the user to access the resource using the public client within the first requested authorization scope.

In an implementation process, the obtaining module 404 is further configured to implement the method described in step 104 to step 108 in the embodiment in FIG. 1. For related content, refer to the related descriptions of the embodiment in FIG. 1, and details are not described herein again.

The execution module 406 is configured to generate, according to the first requested authorization scope and the authorization notification information, a first access token whose authorization scope corresponds to the first requested authorization scope.

In a specific implementation process, the execution module 406 is further configured to generate the first access token according to the first authorization scope after it is determined, according to the authorization notification information, that the owner of the resource agrees to authorize the user who uses the public client to operate the resource within the first authorization scope.

Optionally, the execution module 406 is further configured to generate, according to the first requested authorization scope and the authorization notification information, an authorization credential whose authorization scope corresponds to the first requested authorization scope, and update the authorization credential of the user using the generated authorization credential.

The sending module 408 is configured to send the first access token to the public client according to the requested redirect URI.

In a specific implementation process in order to prevent malicious software from masquerading the public client to apply for an access token, causing an access token leakage threat, the obtaining module 404 is further configured to obtain a registered redirect URI of the public client according to the client identifier, and the execution module 406 is further configured to determine that the requested redirect URI is the same as the registered redirect URI. The registered redirect URI is provided by the public client when the public client is registered with the authorization device. If the requested redirect URI in the first authorization request is different from the registered redirect URI, the authorization device rejects the first authorization request, and the authorization procedure ends.

When the public client is used by multiple different users in order to distinguish different users, the first authorization request further includes user identifiers of the users. The authorization information further includes a user identifier, and a correspondence exists between the user identifier in the authorization information and the authorization credential in the authorization information. The obtaining module 404 being configured to obtain an authorization scope that corresponds to an authorization credential of a user stored in the authorization information includes querying the authorization information according to the user identifier of the user in the first authorization request in order to obtain the authorization credential corresponding to the user identifier of the user, and parsing the authorization credential corresponding to the user identifier of the user in order to obtain the authorization scope corresponding to the authorization credential of the user. The execution module 406 being configured to update the authorization credential of the user using the generated authorization credential includes querying the authorization information according to the user identifier of the user in the first authorization request in order to obtain the authorization credential corresponding to the user identifier of the user, and updating, using the generated authorization credential, the authorization credential corresponding to the user identifier of the user.

Further, when the requested authorization scope in the authorization request received by the receiving module 402 does not exceed the authorization scope corresponding to the authorization credential of the user stored in the authorization device, the execution module 406 may directly generate an access token according to the authorization credential of the user and return the access token to the public client without the need of applying for authentication of the owner of the resource. The receiving module 402 is further configured to receive a second authorization request sent by the public client, where the second authorization request includes the client identifier, the requested redirect URI, and a second requested authorization scope. The obtaining module 404 is further configured to obtain authorization information of the public client according to the client identifier, and obtain an authorization scope that corresponds to an authorization credential of the user stored in the authorization information. The execution module 406 is further configured to generate a second access token whose authorization scope corresponds to the second requested authorization scope or a second original authorization scope if the second requested authorization scope does not exceed the authorization scope corresponding to the authorization credential of the user. The sending module 408 is further configured to send the second access token to the public client according to the requested redirect URI.

Further, when the authorization credential of the user cannot be obtained because it is the first time that the user sends an authorization request for the resource to the authorization device or due to other reasons, the user needs to be authenticated by the owner of the resource before being authorized. The receiving module 402 is further configured to receive a third authorization request sent by the public client, where the third authorization request includes the client identifier, the requested redirect URI, and a third requested authorization scope. The obtaining module 404 is further configured to obtain authorization information of the public client according to the client identifier. The execution module 406 is further configured to determine that no authorization credential of the user exists in the authorization information, obtain authorization notification information of the owner of the resource according to the third requested authorization scope, generate, according to the third requested authorization scope and the authorization notification information, a third access token and a third authorization credential whose authorization scopes correspond to the third authorization scope, and store, in the authorization information, the third authorization credential as an authorization credential of the user. The sending module 408 is further configured to send the third access token to the public client according to the requested redirect URI.

Figure 5:
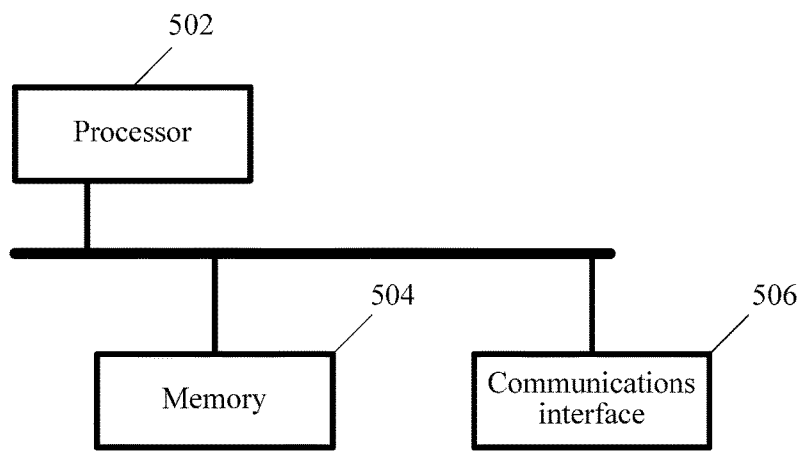
FIG. 5 is another schematic structural diagram of an authorization device according to an embodiment of the present disclosure.

FIG. 5 is another schematic structural diagram of an authorization device according to an embodiment of the present disclosure. A general computer system structure is used, program code for executing a solution of the present disclosure is stored in a memory, and is controlled and executed by a processor. The authorization device includes a bus, a processor 502, a memory 504, and a communications interface 506.

The bus may include a path that transfers information between components of an authorization device.

The processor 502 may be a general-purpose central processing unit (CPU), a microprocessor, an application-specific integrated circuit (ASIC), or one or more integrated circuits configured to control a program to be executed in the solution of the present disclosure. One or more memories included in a computer system may be a read-only memory (ROM) or another type of static storage device that can store static information and an instruction, a random access memory (RAM) or another type of dynamic storage device that can store information and an instruction, or may be a magnetic disk storage. These memories are connected to the processor using the bus.

The communications interface 506 may use any transceiver-type apparatus in order to communicate with another device or a communications network, for example, the Ethernet, a radio access network (RAN), or a wireless local area network (WLAN).

The memory 504, for example, a RAM, stores an operating system and a program that executes the solutions of the present disclosure. The operating system is a program used to control running of another program and manage a system resource. The program code for executing the solution of the present disclosure is stored in the memory 504, and is controlled and executed by the processor 502.

The program stored in the memory 504 instructs the processor to perform an authorization processing method, and the authorization processing method includes receiving a first authorization request sent by a public client, where the first authorization request includes a client identifier of the public client, a requested redirect URI, and a first requested authorization scope, obtaining authorization information of the public client according to the client identifier, obtaining an authorization scope that corresponds to an authorization credential of a user stored in the authorization information, obtaining authorization notification information of an owner of a resource according to the first requested authorization scope if the first requested authorization scope exceeds the authorization scope corresponding to the authorization credential of the user, generating, according to the first requested authorization scope and the authorization notification information, a first access token whose authorization scope corresponds to the first requested authorization scope, and sending the first access token to the public client according to the requested redirect URI. Optionally, the authorization processing method further includes generating an authorization credential whose authorization scope corresponds to the first requested authorization scope, and updating the authorization credential of the user using the generated authorization credential.

It can be understood that the authorization processing device in this embodiment can be configured to implement all the functions in the method embodiment in FIG. 1. For a specific implementation process thereof, refer to the related descriptions of the foregoing method embodiment, and details are not described herein again.

Figure 6:
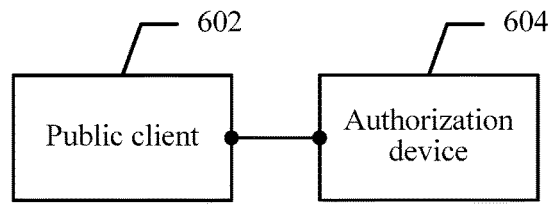
FIG. 6 is a schematic structural diagram of an authorization processing system according to an embodiment of the present disclosure.

FIG. 6 is a schematic structural diagram of an authorization processing system according to an embodiment of the present disclosure. As shown in FIG. 6, the system includes a public client 602 and an authorization device 604.

The public client 602 is configured to send a first authorization request to the authorization device, where the first authorization request includes a client identifier of the public client, a requested redirect URI, and a first requested authorization scope, and receive a first access token sent by the authorization device.

The authorization device 604 is configured to receive the first authorization request sent by the public client, obtain authorization information of the public client according to the client identifier, obtain an authorization scope that corresponds to an authorization credential of the user stored in the authorization information, obtain authorization notification information of an owner of the resource according to the first requested authorization scope if the first requested authorization scope exceeds the authorization scope corresponding to the authorization credential of the user, generate, according to the first requested authorization scope and the authorization notification information, a first access token whose authorization scope corresponds to the first requested authorization scope, and send the first access token to the public client according to the requested redirect URI.

For more detailed descriptions of the authorization device 604, refer to the descriptions of the authorization service shown in FIG. 4, and related content is not described herein again.

Content such as information exchange and an execution process between the modules in the foregoing device and system is based on a same idea as the method embodiments of the present disclosure. Therefore, for detailed content, refer to the descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer readable storage medium. The processes of the methods in the embodiments are performed when the program runs. The foregoing storage medium may include a magnetic disk, an optical disc, a ROM, or a RAM.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. An authorization processing method, implemented by an authorization device, for authorizing a user to access a resource using a public client, comprising:

receiving a first authorization request from the public client, wherein the first authorization request comprises a client identifier of the public client, a user identifier of the user, a requested redirect uniform resource identifier (URI), and a first requested authorization scope;

obtaining a registered redirect URI of the public client according to the client identifier;

determining that the requested redirect URI is the same as the registered redirect URI;

obtaining, after determining that the requested redirect URI is the same as the registered redirect URI, authorization information of the public client according to the client identifier, wherein the authorization information corresponds to the client identifier and is stored by the authorization device, wherein the authorization information comprises the user identifier and an authorization credential corresponding to the user identifier, and wherein the authorization credential includes information of an authorization scope;

obtaining authorization notification information of an owner of the resource according to the first requested authorization scope when the first requested authorization scope exceeds the authorization scope, wherein the authorization notification information indicates that the owner agrees to authorize the user to access the resource using the public client within the first requested authorization scope;

generating a first access token whose authorization scope corresponds to the first requested authorization scope; and sending the first access token to the public client according to the requested redirect URI.

2. The method according to claim 1, wherein obtaining the authorization notification information of the owner comprises:

sending an authentication request to the owner, wherein the authentication request comprises the first requested authorization scope; and receiving an authentication response message from the owner, wherein the authentication response message comprises the authorization notification information.

3. The method according to claim 1, wherein after obtaining the authorization notification information of the owner, the method further comprises:

generating a second authorization credential whose authorization scope corresponds to the first requested authorization scope; and updating the authorization credential of the user using the second authorization credential.

4. The method according to claim 3, wherein updating the authorization credential of the user using the second authorization credential comprises:

querying the authorization information according to the user identifier of the user in the first authorization request to obtain the authorization credential corresponding to the user identifier of the user; and updating, using the second authorization credential, the authorization credential corresponding to the user identifier of the user.

5. The method according to claim 3, further comprising:

receiving a second authorization request from the public client, wherein the second authorization request comprises the client identifier, the requested redirect URI, and a second requested authorization scope;

obtaining the authorization information according to the client identifier;

obtaining the authorization scope corresponding to the authorization credential;

generating a second access token whose authorization scope corresponds to the second requested authorization scope when the second requested authorization scope does not exceed the authorization scope; and sending the second access token to the public client according to the requested redirect URI.

6. The method according to claim 3, further comprising:

receiving a second authorization request from the public client, wherein the second authorization request comprises the client identifier, the requested redirect URI, and a second requested authorization scope;

obtaining the authorization scope corresponding to the authorization credential;

generating a second access token whose authorization scope corresponds to the authorization credential when the second requested authorization scope does not exceed the authorization scope; and sending the second access token to the public client according to the requested redirect URI.

7. The method according to claim 1, further comprising:

receiving a third authorization request from the public client, wherein the third authorization request comprises the client identifier, the requested redirect URI, and a third requested authorization scope;

determining that no authorization credential of the user exists in the authorization information;

obtaining additional authorization notification information of the owner according to the third requested authorization scope;

generating, according to the third requested authorization scope and the additional authorization notification information, a third access token and a third authorization credential whose authorization scopes correspond to the third requested authorization scope;

storing, in the authorization information, the third authorization credential as an authorization credential of the user; and sending the third access token to the public client according to the requested redirect URI.

8. An authorization device for authorizing a user to access a resource using a public client, comprising:

a memory comprising a plurality of computer readable instructions; and a processor coupled to the memory, wherein the plurality of computer readable instructions cause the processor to be configured to:

receive a first authorization request from the public client, wherein the first authorization request comprises a client identifier of the public client, a user identifier of the user, a requested redirect uniform resource identifier (URI), and a first requested authorization scope;

obtain a registered redirect URI of the public client according to the client identifier;

determine that the requested redirect URI is the same as the registered redirect URI;

obtain, after determining that the requested redirect URI is the same as the registered redirect URI, authorization information of the public client according to the client identifier, wherein the authorization information corresponds to the client identifier and is stored by the authorization device, wherein the authorization information comprises the user identifier and an authorization credential corresponding to the user identifier, and wherein the authorization credential includes information of an authorization scope;

obtain authorization notification information of an owner of the resource according to the first requested authorization scope when the first requested authorization scope exceeds the authorization scope, wherein the authorization notification information indicates that the owner agrees to authorize the user to access the resource using the public client within the first requested authorization scope;

generate a first access token whose authorization scope corresponds to the first requested authorization scope; and send the first access token to the public client according to the requested redirect URI.

9. The device according to claim 8, wherein the plurality of computer readable instructions further cause the processor to be configured to:

send an authentication request to the owner, wherein the authentication request comprises the first requested authorization scope; and receive an authentication response message from the owner, wherein the authentication response message comprises the authorization notification information.

10. The device according to claim 8, wherein the plurality of computer readable instructions further cause the processor to be configured to:

generate, according to the first requested authorization scope, a second authorization credential whose authorization scope corresponds to the first requested authorization scope; and update the authorization credential of the user using the second authorization credential.

11. The device according to claim 10, wherein the plurality of computer readable instructions further cause the processor to be configured to:

query the authorization information according to the user identifier in the first authorization request to obtain the authorization credential; and update, using the second authorization credential, the authorization credential.

12. The device according to claim 10, wherein the plurality of computer readable instructions further cause the processor to be configured to:

receive a second authorization request from the public client, wherein the second authorization request comprises the client identifier, the requested redirect URI, and a second requested authorization scope;

obtain the authorization scope corresponding to the authorization credential;

generate a second access token whose authorization scope corresponds to the second requested authorization scope when the second requested authorization scope does not exceed the authorization scope; and send the second access token to the public client according to the requested redirect URI.

13. The device according to claim 10, wherein the plurality of computer readable instructions further cause the processor to be configured to:

receive a second authorization request from the public client, wherein the second authorization request comprises the client identifier, the requested redirect URI, and a second requested authorization scope;

obtain the authorization scope corresponding to the authorization credential;

generate a second access token whose authorization scope corresponds to a second original authorization scope when the second requested authorization scope does not exceed the authorization scope; and send the second access token to the public client according to the requested redirect URI.

14. The device according to claim 8, wherein the plurality of computer readable instructions further cause the processor to be configured to:
 receive a third authorization request sent by the public client, wherein the third authorization request comprises the client identifier, the requested redirect URI, and a third requested authorization scope;
 determine that no authorization credential of the user exists in the authorization information;
 obtain additional authorization notification information of the owner according to the third requested authorization scope;
 generate, according to the third requested authorization scope, a third access token and a third authorization credential whose authorization scopes correspond to the third requested authorization scope;
 store, in the authorization information, the third authorization credential as an authorization credential of the user; and
 send the third access token to the public client according to the requested redirect URI.

15. An authorization processing system, used to authorize a user to access a resource using a terminal device on which a public client runs, comprising:
 a terminal device comprising:
  a memory comprising a plurality of computer readable instructions; and
  a processor coupled to the memory and configured to execute the plurality of computer readable instructions to:
   send a first authorization request, wherein the first authorization request comprises a client identifier of the public client, a user identifier of the user, a requested redirect uniform resource identifier (URI), and a first requested authorization scope; and
   receive a first access token; and
 an authorization device comprising:
  a second memory comprising a second plurality of computer readable instructions; and
  a second processor coupled to the second memory and configured to execute the second plurality of computer readable instructions to:
   receive the first authorization request from the terminal device;
   obtain a registered redirect URI of the public client according to the client identifier;
   determine that the requested redirect URI is the same as the registered redirect URI;
   obtain, after determining that the requested redirect URI is the same as the registered redirect URI, authorization information of the public client according to the client identifier, wherein the authorization information corresponds to the client identifier and is stored by the authorization device, wherein the authorization information comprises the user identifier and an authorization credential corresponding to the user identifier, and wherein the authorization credential includes information of an authorization scope;
   obtain authorization notification information of an owner of the resource according to the first requested authorization scope when the first requested authorization scope exceeds the authorization scope, wherein the authorization notification information indicates that the owner agrees to authorize the user to access the resource using the public client within the first requested authorization scope;
   generate the first access token whose authorization scope corresponds to the first requested authorization scope; and
   send the first access token to the terminal device according to the requested redirect URI.

16. The authorization processing system according to claim 15, wherein the processor of the terminal device is configured to send a second authorization request to the authorization device to access the resource after the first access token expires.

17. The authorization processing system according to claim 16, wherein the first access token expires after a first period, wherein the authorization credential of the user expires after a second period, and wherein the second period is longer than the first period.

18. The authorization processing system according to claim 15, wherein the second processor is further configured such that after obtaining the authorization notification information, the authorization device generates a second authorization credential whose authorization scope corresponds to the first requested authorization scope.

19. The authorization processing system according to claim 15, wherein the second processor is further configured to obtain the authorization notification information of the owner by:
 sending an authentication request to the owner; and
 receiving an authentication response message from the owner.

20. The authorization processing system according to claim 19, wherein the authentication request comprises the first requested authorization scope, and wherein the authentication response message comprises the authorization notification information.

* * * * *